No. 727,976. PATENTED MAY 12, 1903.
W. M. LANDERS.
ANIMAL YOKE.
APPLICATION FILED JAN. 21, 1903.
NO MODEL. 2 SHEETS—SHEET 1.
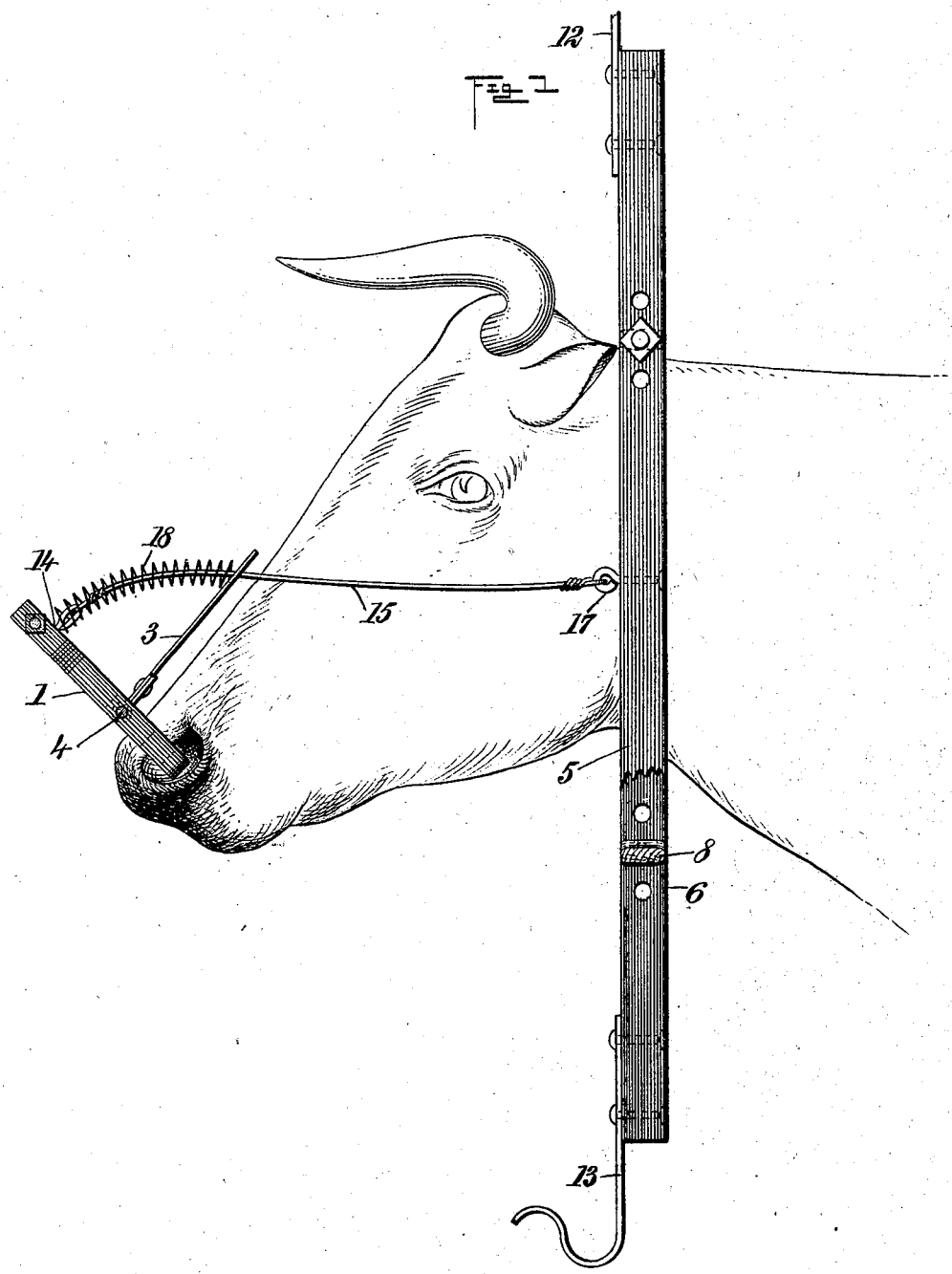
WITNESSES:
INVENTOR
Willis M. Landers
BY
ATTORNEYS.

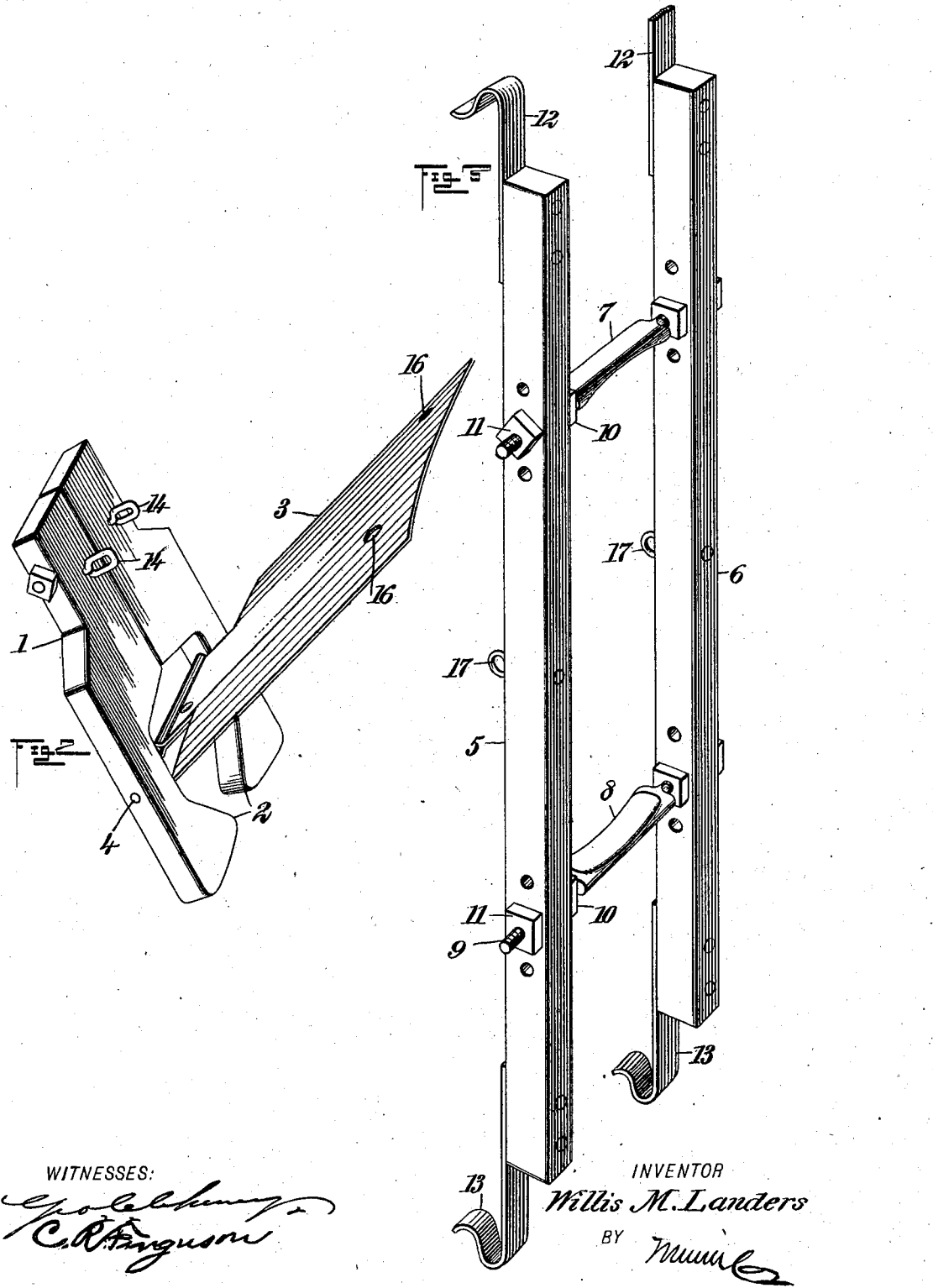

No. 727,976. Patented May 12, 1903.

UNITED STATES PATENT OFFICE.

WILLIS M. LANDERS, OF LAWN, TEXAS.

ANIMAL-YOKE.

SPECIFICATION forming part of Letters Patent No. 727,976, dated May 12, 1903.

Application filed January 21, 1903. Serial No. 139,931. (No model.)

*To all whom it may concern:*

Be it known that I, WILLIS M. LANDERS, a citizen of the United States, and a resident of Lawn, in the county of Taylor and State of Texas, have invented a new and Improved Animal-Yoke, of which the following is a full, clear, and exact description.

This invention relates to improvements in animal-yokes, particularly for cattle, the object being to provide a yoke of simple and comparatively inexpensive construction that will prevent an animal wearing the same from passing through a wire or other fence.

I will describe an animal-yoke embodying my invention and then point out the novel features in the appended claims.

Reference is to be had to the accompanying drawings, forming a part of this specification, in which similar characters of reference indicate corresponding parts in all the figures.

Figure 1 is a side elevation of an animal-yoke embodying my invention, showing the same as attached to a cow. Fig. 2 is a perspective view of the nose or face portion of the device, and Fig. 3 is a perspective view of the neck portion.

Referring to the drawings, 1 designates the part for engaging over an animal's nose. This part consists of wood and is made of two sections bolted together, as clearly indicated in Fig. 2. At the lower portion the nose plate or part is bifurcated, and at the lower ends of the members are inward projections 2 for engaging in the animal's nostrils. The face-plate 3 consists of sheet metal, and it has swinging connection with the part 1. As here shown, it swings on a rod 4. The part for engaging around the animal's neck just back of the head consists of bars 5 6, which pass along the opposite sides of the neck. The bars 5 6 are connected by cross-bars 7 and 8, one to engage on the top of the neck and the other to pass underneath the neck. These bars have threaded ends 9 for passing through openings in the bars 5 6, and by means of nuts 10 at the inner side and nuts 11 at the outer side the said bars 7 and 8 may be lengthened or shortened to adjust the space between the vertical members 5 6, and the said bars 5 6 are also each provided with a series of holes, so that the distance between the bars 7 and 8 may be regulated or adjusted as required.

On the upper ends of the bars 5 6 are hooks 12, which have a downward curve, and on the lower ends of said bars are hooks 13, the ends of which have an upward curve. From eyes 14 on the upper portion of the nose part 1 rods 15 extend through openings 16 in the face-plate 3 to connections with eyes 17 on the bars 5 6, and arranged between the face-plate 3 and the part 1 are springs 18. These springs are shown as coiled around the rods 15, engaging at one end with the plate 3 and engaging at the other end with the part 1.

While I have shown the yoke and described it as attached to a cow, it is to be understood that it may be applied to horses or mules.

In the operation should the animal force his head through a fence the hooks 12 will engage with the upper wire or rail of the fence and the hooks 13 will engage with the lower wire or rail of the fence. Then while trying to force the head farther through the fence the neck portion of the yoke will be forced back and the rods 15 will tighten the springs 18, which will give a wrench or pull on the animal's nose.

By omitting the neck portion of the yoke the parts 1 and 3 may be placed on a calf for the purpose of weaning. In this case instead of the rods 15 cords or straps will be employed and passed back or around the head directly below the neck.

Having thus described my invention, I claim as new and desire to secure by Letters Patent—

1. An animal-yoke comprising a plate for engaging over an animal's nose, a plate having swinging connection with the first-named plate and arranged to pass over the animal's face, a spring yielding connection between the plates, and means for holding said plates in place.

2. An animal-yoke comprising a plate for engaging over an animal's nose and in the nostrils, a plate having swinging connection with the first-named plate and arranged to pass over the animal's face, a spring yielding connection between the plates, a neck-yoke and connections between said neck-yoke and the first-named plate.

3. An animal-yoke comprising a part for engaging over an animal's nose and in the animal's nostrils, a part having swinging connection with said nose part, the said part having openings, a neck-yoke, rods extended from said neck-yoke through said openings and connecting with the nose part, and a spring between said nose part and the swinging part.

4. An animal-yoke comprising a part for engaging over an animal's nose and having inward projections at the lower end for engaging in the nostrils, a plate having swinging connection with the nose part, said plate having openings, a part for engaging the animal's neck consisting of side bars and upper and lower cross-bars, rods extended from said bars through the openings of the plate to connections with the nose part, springs surrounding said rods between the nose part and plate, and hooks on the ends of said bars.

5. An animal-yoke comprising a part for engaging over an animal's nose, and having inward projections at the lower end for engaging in the nostrils, a plate having swinging connection with the nose part, said plate having openings, a part for engaging the animal's neck consisting of side bars and upper and lower cross-bars, rods extended from said bars through the openings of the plate to connections with the nose part, springs surrounding said rods between the nose part and plate, and hooks on the ends of said bars, the said cross-bars of the neck part being adjustable lengthwise and also adjustable vertically in relation to the side bars.

In testimony whereof I have signed my name to this specification in the presence of two subscribing witnesses.

WILLIS M. LANDERS.

Witnesses:
  H. M. WHITTLE,
  H. J. McBEE.